(12) United States Patent
Lin

(10) Patent No.: US 7,421,889 B2
(45) Date of Patent: Sep. 9, 2008

(54) TIRE PRESSURE WARNING ASSEMBLY HAVING A BIASING MEMBER

(76) Inventor: Pao-Hung Lin, 8F-2, No. 299, Fusing Rd., Taoyuan City (TW)

( * ) Notice: Subject to any disclaimer, the term of this patent is extended or adjusted under 35 U.S.C. 154(b) by 0 days.

(21) Appl. No.: 11/607,059

(22) Filed: Dec. 1, 2006

(65) Prior Publication Data

US 2008/0129476 A1    Jun. 5, 2008

(51) Int. Cl.
*G01M 17/02* (2006.01)
(52) U.S. Cl. .................. 73/146; 73/146.3; 73/146.8; 340/442
(58) Field of Classification Search ........ 73/146–146.8; 340/442–447
See application file for complete search history.

(56) References Cited

U.S. PATENT DOCUMENTS

| | | | | |
|---|---|---|---|---|
| 4,945,337 A | * | 7/1990 | Huang | 340/442 |
| 5,025,244 A | * | 6/1991 | Huang | 340/442 |
| 5,604,481 A | * | 2/1997 | Lin | 340/442 |
| 5,856,619 A | * | 1/1999 | Wang | 73/146.5 |
| 6,006,600 A | * | 12/1999 | Cheng | 73/146.5 |
| 6,034,596 A | * | 3/2000 | Smith et al. | 340/447 |
| 6,351,990 B1 | * | 3/2002 | McInnes | 73/146.8 |
| 6,629,454 B2 | * | 10/2003 | Lundqvist | 73/146.8 |
| 6,817,235 B2 | * | 11/2004 | Sapir | 73/146 |

* cited by examiner

*Primary Examiner*—Andre J. Allen
*Assistant Examiner*—Jermaine Jenkins
(74) *Attorney, Agent, or Firm*—Troxell Law Office, PLLC

(57) ABSTRACT

A tire pressure warning assembly includes a tire valve with a switch received therein, which had a conductive member, a movable member and a biasing member. The movable member is located at a distance from the conductive member and one end of the movable member is exposed to the air in the valve and the other end of the movable member is in contact with the biasing member, which exerts a force to the movable member. The tire pressure compresses the biasing member. When the tire pressure is less than the biasing force of the biasing member, the biasing member pushes the movable member to contact the conductive member to form a circuit so that the warning device sends a signal to the driver.

9 Claims, 4 Drawing Sheets

TIRE PRESSURE WARNING ASSEMBLY HAVING A BIASING MEMBER

FIELD OF THE INVENTION

The present invention relates to a warning assembly, especially for a tire pressure warning assembly, which sends a message to the driver when the tire pressure is below a pre-set value.

BACKGROUND OF THE INVENTION

Vehicles and motorbikes provide a convenient and quick way to transport people from one place to another. Nevertheless, the high-speed vehicles and motorbikes involve fatal risks.

Generally, vehicle or motorbike accidents are caused mostly by mis-operation and some of the accidents are caused by poor maintenance wherein most drivers ignore the tire pressure check. The technicians check the tire pressure every time when the driver brings his/her vehicle to have maintenance, however, the driver does not check the tire pressure gradually. Vehicle tires that do not have sufficient tire pressure will increase fuel consumption and result in bad control. These tires might also lead to a dangerous situation especially when the vehicle runs at high speed.

In order to improve the shortcoming and provide a prompt warning feature to the driver when the tire pressure is below an expected value, the applicant invents the tire pressure warning assembly.

SUMMARY OF THE INVENTION

The present invention relates to a tire pressure warning assembly which comprises a tire valve with a switch received therein which has a conductive member, a movable member and a biasing member, and a cover in connection with the valve having a casing which has a battery set received therein, the battery set having one pole connected with the movable member and the other pole of the battery set being in contact with a warning device, the warning device electrically connected with the conductive member. The movable member is located at a distance from the conductive member and one end of the movable member is exposed to the air in the valve and the other end of the movable member is in contact with the biasing member, which exerts a force to the movable member. The tire pressure compresses the biasing member. When the tire pressure is less than the biasing force of the biasing member, the biasing member pushes the movable member to contact the conductive member to form a circuit so that the warning device sends a signal to the driver.

The primary objective of the present invention is to provide a tire pressure warning assembly, which includes a biasing member, which is compressed by the tire pressure, and the biasing member pushes a switch to activate a warning device when the tire pressure is less than a pre-set value so as to inform the driver to inflate the tire.

Another objective of the present invention is to provide a tire pressure warning assembly which includes a biasing member so as to set desired pressure value for different needs of tires.

Yet another objective of the present invention is to provide a tire pressure warning assembly wherein the switch is maintained in an OFF status when the biasing member is compressed so as to prolong the use period of the battery set.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
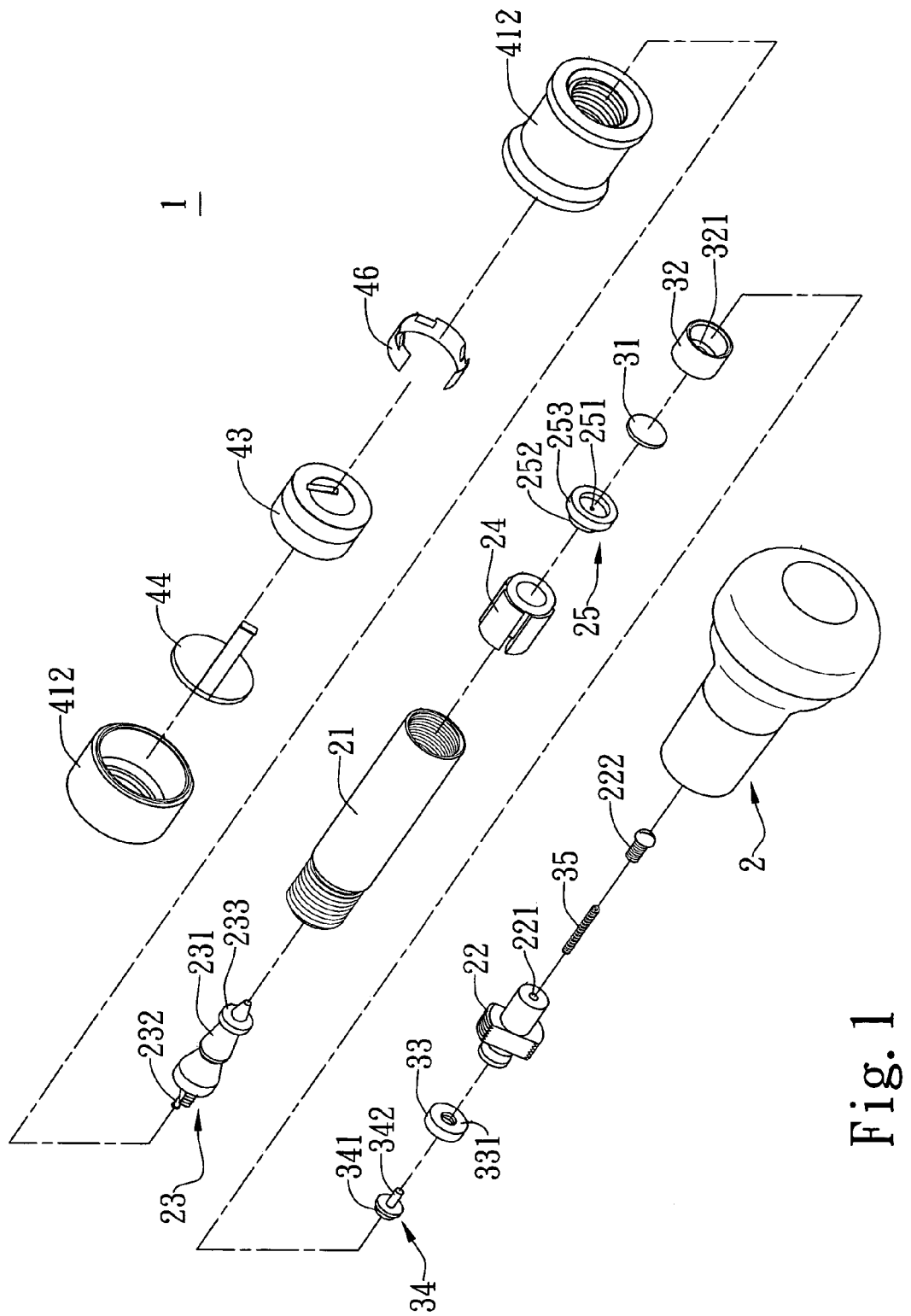
FIG. 1 is an exploded view to show the tire pressure warning assembly of the present invention.
Figure 2:
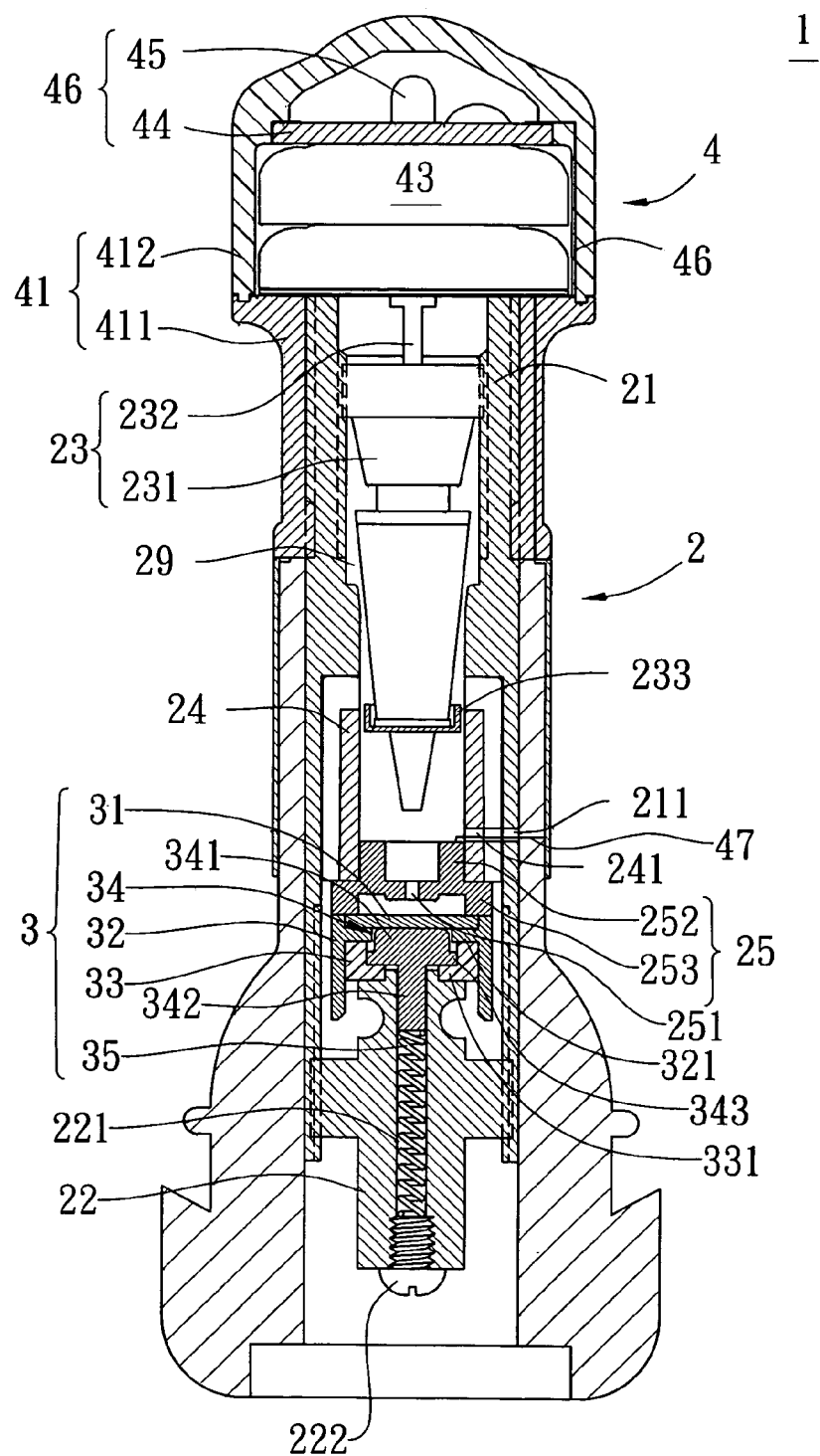
FIG. 2 is a cross sectional view of the tire pressure warning assembly of the present invention.

Referring to FIGS. 1 and 2, the tire pressure warning assembly 1 of the present invention comprises a tire valve 2, a switch 3 and a cover 4.

Figure 3:
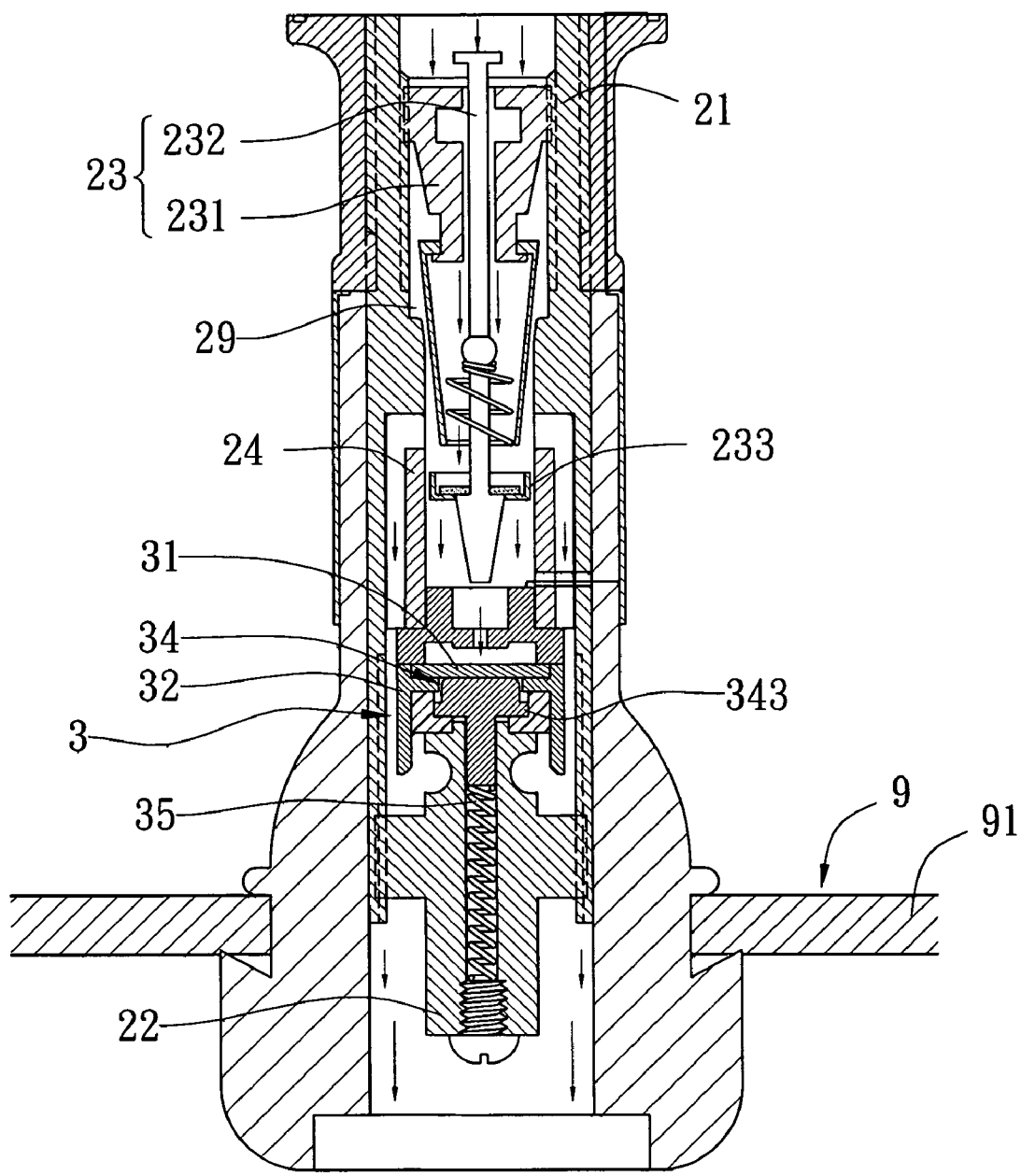
FIG. 3 shows the tire pressure warning assembly of the present invention when the tire is inflated.

The tire valve 2 is connected to a rim 91 of a tire 9 as shown in FIG. 3 and the tire valve 2 includes a tube 21 and a base 22 which has several tubular sections with different outer diameters and threads are defined on an outer periphery of the section having the largest outer diameter. The base 22 has a passage 221 and an inner threaded periphery defined in a lower section of the passage 221 so as to be in threaded connection with a regulation valve 222.

The tube 21 has a first hole 211 defined through a wall in the lower end thereof and a top end of the tube 21 extends out from the tire valve 2 and includes outer and inner threaded peripheries. The tube 21 includes an inner threaded periphery so as to be connected with the largest section of the base 22. The tube 21 has a core piece 23, a ring 24 and a cap 25 co-axially received therein. The core piece 23 includes a positioning portion 231 fixed in the tube 21, a slidable piece 232 that is slidable relative to the positioning portion 231, and a one-direction valve 233. The one-direction valve 233 is connected to the slidable piece 232 and the ring 24 has notches defined in the outer periphery thereof and is connected to the core piece 23. The one-direction valve 233 is received in the top portion of the ring 24 and a second hole 241 is defined through the wall of the lower portion of the ring 24. A cap 25 has a passage 251 defined centrally therein and has a protrusion 252 and a collar 253, wherein the protrusion 252 is received in the lower portion of the ring 24.

The switch 3 is located between the cap 25 and the base 22, and includes a flexible sheet 31, a conductive member 32, a movable member 34 and a biasing member 35.

The flexible sheet 31 is circular and its upper periphery is disposed below the lower periphery of the cap 25. The flexible sheet 31 has its upper central portion exposed to the air in the tire valve 2. The conductive member 32 is cylindrical and has a separation plate 321 therein, which has a central hole. An upper recess is defined in an upper end of the separation plate 321 for receiving the flexible sheet 31 therein. A lower recess is defined in a lower end of the separation plate 321 so as to receive the positioning member 33. The positioning member 33 is cylindrical and is made of insulating material. An end plate 331 having a central hole is connected to the bottom of the positioning member 33 and the end plate 331 is disposed on the top of the base 22. The slidable member 34 is a rod with several sections with different diameters and includes a large-diameter portion 341 and a small-diameter portion 342. The large-diameter portion 341 is received in the central hole of the separation plate 321 and the small-diameter portion 342 extends through the central hole of the end plate 331 and is pivotably connected to the passage 221 of the base 22. The top end of the large-diameter portion 341 is in contact with a lower end of the flexible sheet 31, and the lower end of the large-diameter portion 341 has a flange 343 which is positioned in the positioning member 33 so that the top end of the flange 343 can be in contact with or be disengaged from the lower end of the separation plate 321. Furthermore, the biasing member 35 is a spiral spring and can be any type of spring such as springboard or rubber piece. The biasing member 35 is received in the passage 221 of the base 22 so as to push the small-diameter portion 342 of the movable member 34 upward.

The cover 4 includes a transparent casing 41, which includes a tubular portion 411 and a top cover 412, which is connected with the tubular portion 411. The tubular portion 411 has an inner threaded periphery so as to be connected with the outer threads of the tire valve 2 and connect the cover 4 with the tire valve 2. A battery set 43 is received in the cover 4 and a negative pole of the battery set 43 is in contact with the upper end of the tube 21 so as to electrically connect the tube 21, the base 22 and the movable member 34 of the switch 3. The positive pole of the battery set 43 is connected with a circuit board 44 and a warning member 45. The circuit board 44 is connected to a conductive wire 47 by a metal conductive piece 46, and the conductive wire 47 extends through the first and second holes 211, 241 of the tube 21 and the ring 24 so as to be connected with the cap 25. The cap 25 is electrically connected with the conductive member 32. The circuit board 44 and the warning member 45 compose a warning device 48, wherein the warning member 45 can be a Light Emitting Diode or an audio generating device. The warning device 48 can also be composed of a circuit board and a signal-emitting device.

FIGS. 1 and 3 show the airflow in the tire valve 2 when inflating. When the slidable piece 232 of the core piece 23 are moved downward by the pressure, the one-direction valve 233 is opened so that air enters into the tube 21 via the gap between the slidable piece 232 and the positioning portion 231. The other path of the airflow entering into the tire 9 is the gap between the threads of the ring 24, base 22 and the tube 21. Therefore, the tube 21 and the tire 9 have the same pressure.

During the inflating process of the tire 9, the upper end of the flexible sheet 31 of the switch 3 is compressed by the air pressure within the tire valve 2 so as to compress the biasing member 35. A gap is defined between the conductive member 32 and the movable member 34 so that the switch 3 is in OFF status.

Figure 4:
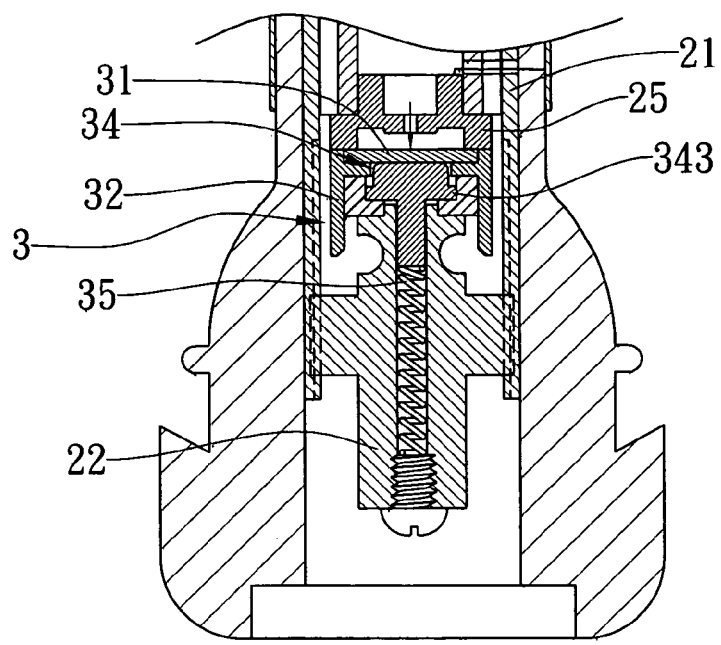
FIG. 4 shows that the switch of the tire pressure warning assembly of the present invention is in OFF status.
Figure 5:
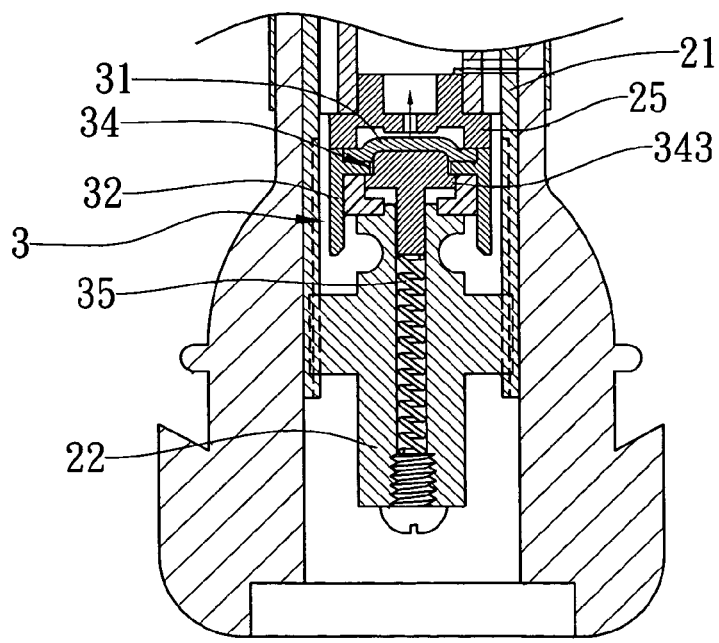
FIG. 5 shows that that the switch of the tire pressure warning assembly of the present invention is in ON status.

As shown in FIGS. 2, 4 and 5, when the tire 9 leaks and the pressure in the tire 9 is lower than the pre-set value of the biasing member 35, the biasing member 35 pushes the movable member 34 whose flange 343 contacts the conductive member 32 so that a circuit is formed between the battery set 43, the tube 21, the base 22, the movable member 34, the conductive member 32, the cap 25 and the warning device 48 which then sends a warning signal to the driver.

The present invention includes the following advantages:
1. When the tire pressure is lower than the pre-set value of the biasing member, a signal is sent to the driver so as to maintain the tire at a normal pressure and this can prolong the period of use for the tire and reduce consumption of fuel and accident possibility.
2. Electric power is needed only when the tire pressure is lower than the pre-set value of the biasing member, so that there has no need of electric power from the battery set when the tire pressure is in normal range.
3. The biasing member can be adjusted by using a regulation valve so as to set the minimum pressure for the tires to meet different needs when used in different vehicles.

While we have shown and described the embodiment in accordance with the present invention, it should be obvious to those skilled in the art that some variations and modifications may be made without departing from the scope of the present invention.

What is claimed is:

1. A tire pressure warning assembly comprising:
a tire valve, connected to a tire;
a switch, received in the tire valve and having a conductive member, a movable member and a biasing member, wherein the movable member is located at a distance from the conductive member, a first end of the movable member being exposed to the air in the valve and a second end of the movable member being in contact with the biasing member which exerts a force to the movable member, and
a cover, connected to the tire valve and having a casing which has a battery set received therein, the battery set having one pole connected with the movable member and the other pole of the battery set being in contact with a warning device, the warning device electrically connected with the conductive member, and the biasing member pushing the movable member to be in contact with the conductive member to form a circuit when pressure of the tire is less than the pre-set value of the biasing member so as to activate the warning device,
wherein the tire valve includes a tube and a base which is connected to an end of the tube, and the base has a passage in which the movable member and the biasing member are received,
wherein a core piece is located in the tube and includes a positioning portion, a slidable piece which is slidable relative to the positioning portion, and a one-direction valve which is connected to the slidable piece, and a ring is connected to the core piece and a cap is located beneath the ring and presses on a periphery of the conductive member.

2. The warning assembly as claimed in claim 1, wherein the switch includes a flexible sheet, which has one end, exposed to the air in the tire valve and the other end of the flexible sheet is in contact with the movable member.

3. The warning assembly as claimed in claim 1, wherein the switch includes a positioning member, which is located between the movable member and the conductive member.

4. The warning assembly as claimed in claim 1, wherein a regulation valve is located in the passage of the base so as to adjust the biasing member.

5. The warning assembly as claimed in claim 1, wherein the warning device includes a circuit board and a warning member.

6. The warning assembly as claimed in claim 5, wherein the warning member is a Light Emitting Diode.

7. The warning assembly as claimed in claim 5, wherein the warning member is an audio generating device.

8. The warning assembly as claimed in claim 1, wherein the warning device includes a circuit board and a signal-emitting device.

9. The warning assembly as claimed in claim 1, wherein the casing includes a tubular portion and a top cover which is connected with the tubular portion, and the battery set and the warning device are received in the casing.

* * * * *